No. 652,727. Patented June 26, 1900.
F. W. SHULS.
SET WORKS FOR SAWMILLS.
(Application filed Feb. 28, 1900.)
(No Model.) 5 Sheets—Sheet 1.
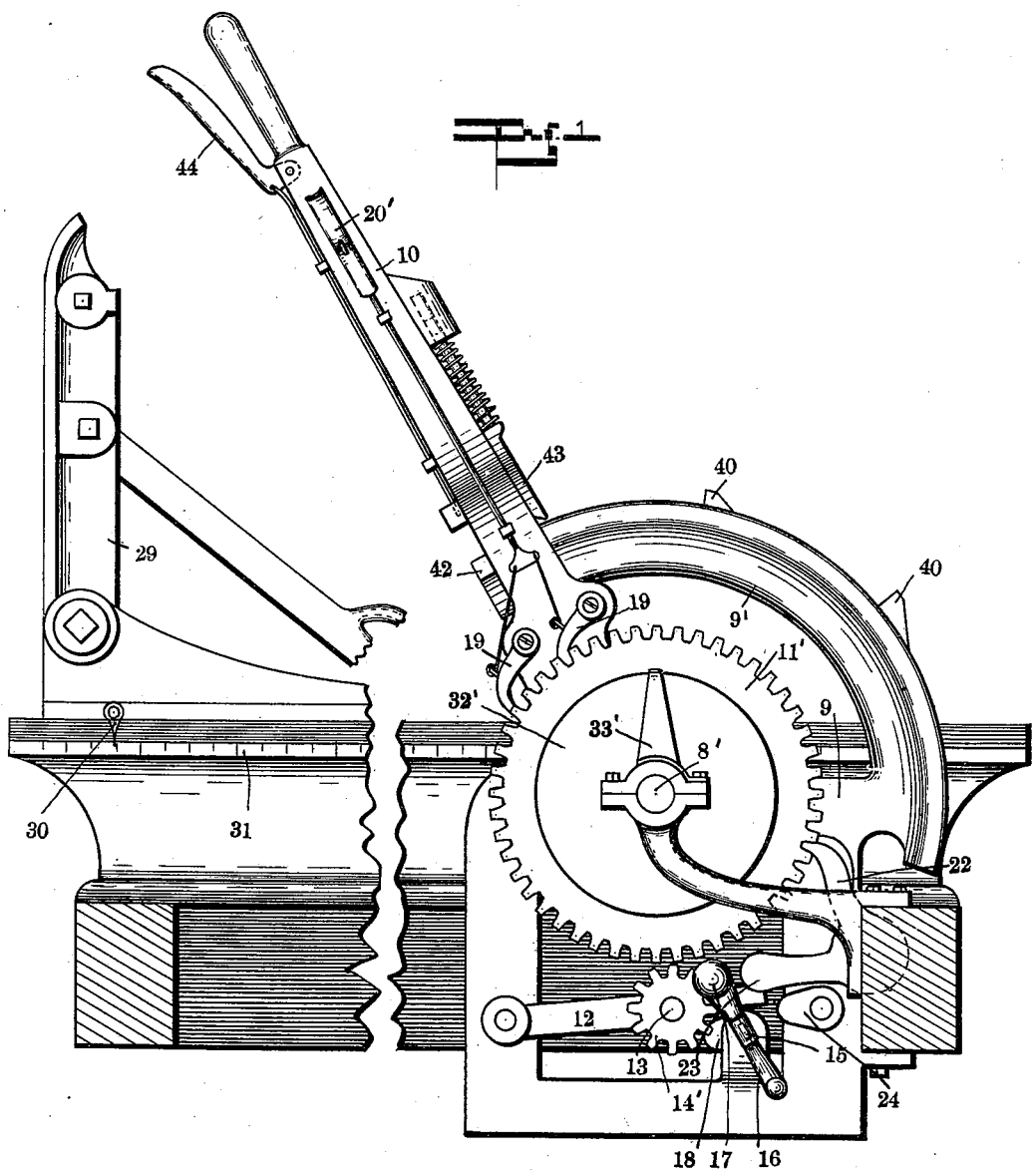
WITNESSES:
Frank A. Felch
Bertha M. Ballard
INVENTOR
Frederic W. Shuls.
BY
Arthur M. Hood
ATTORNEY.

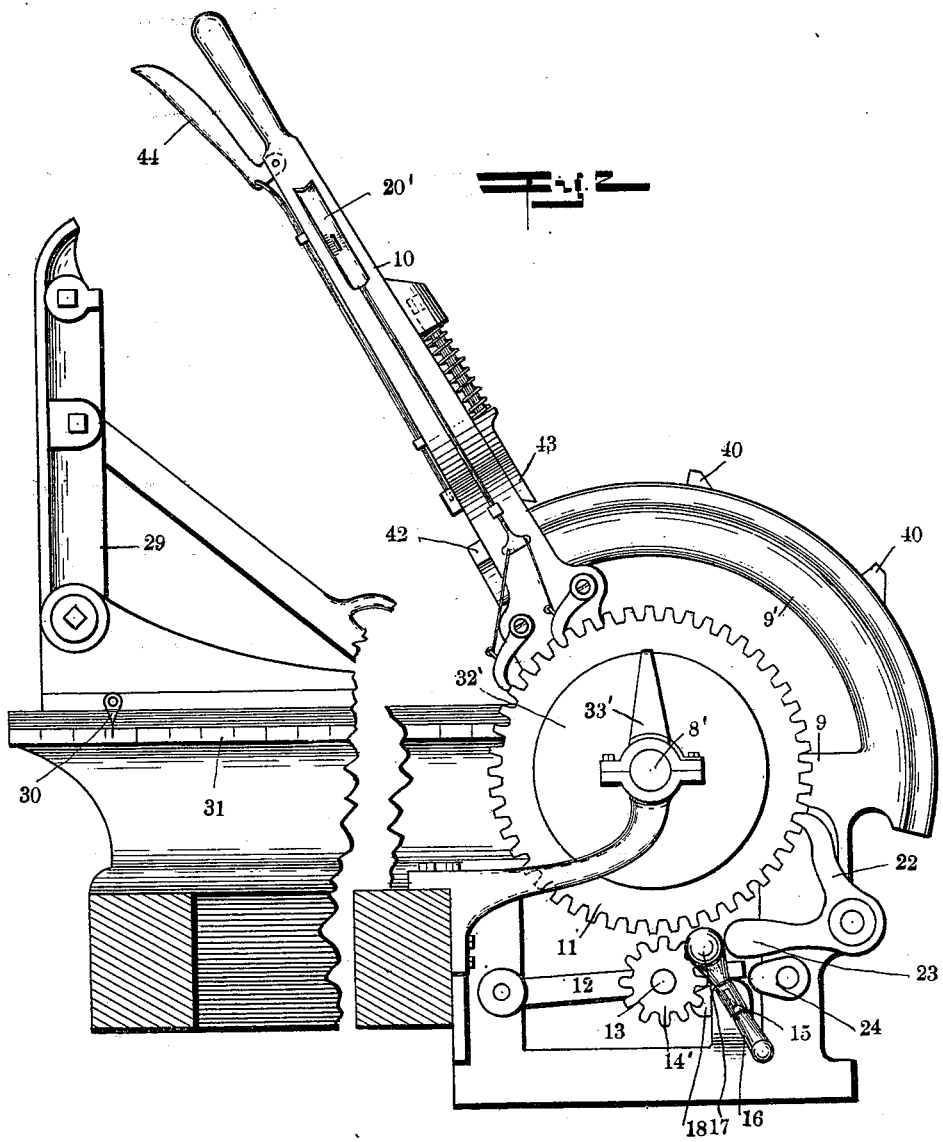

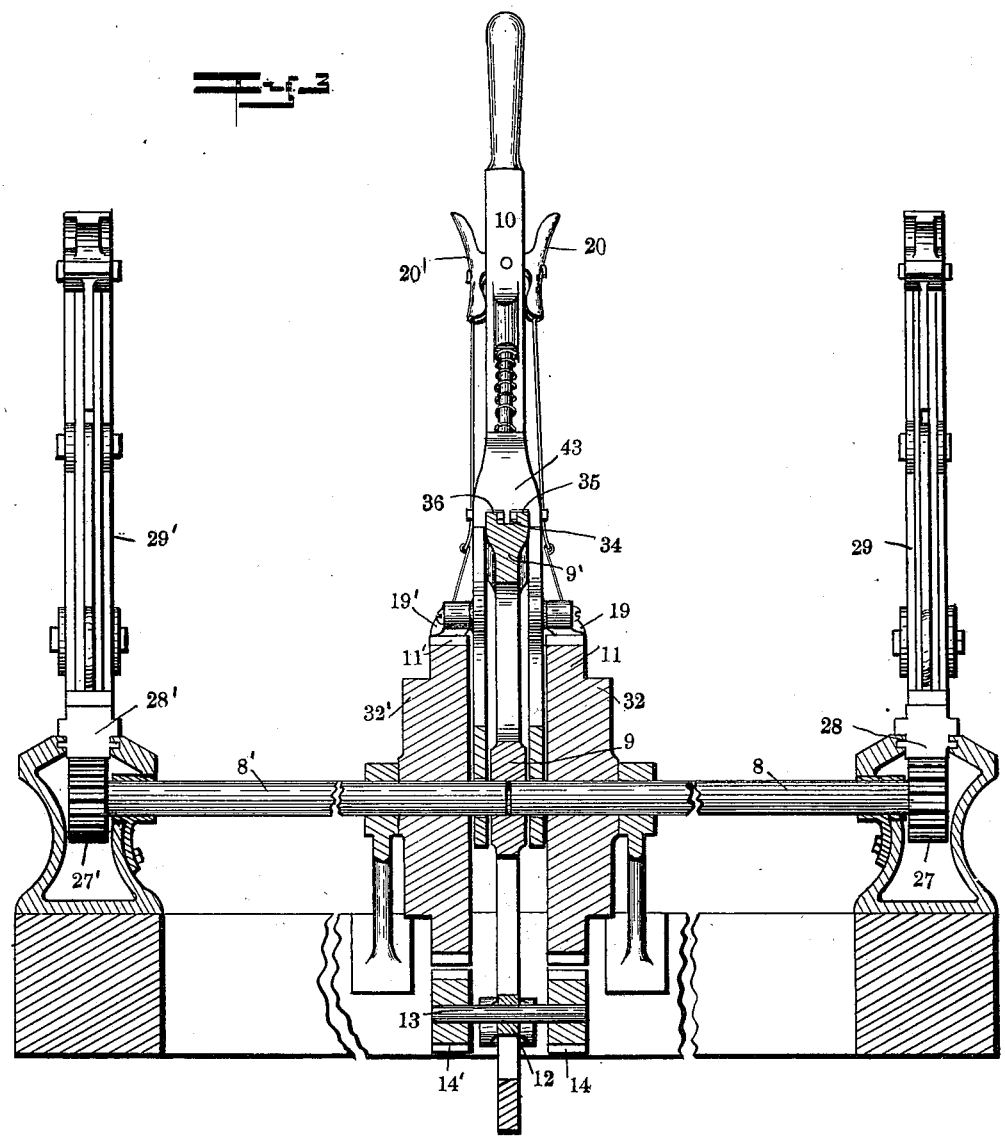

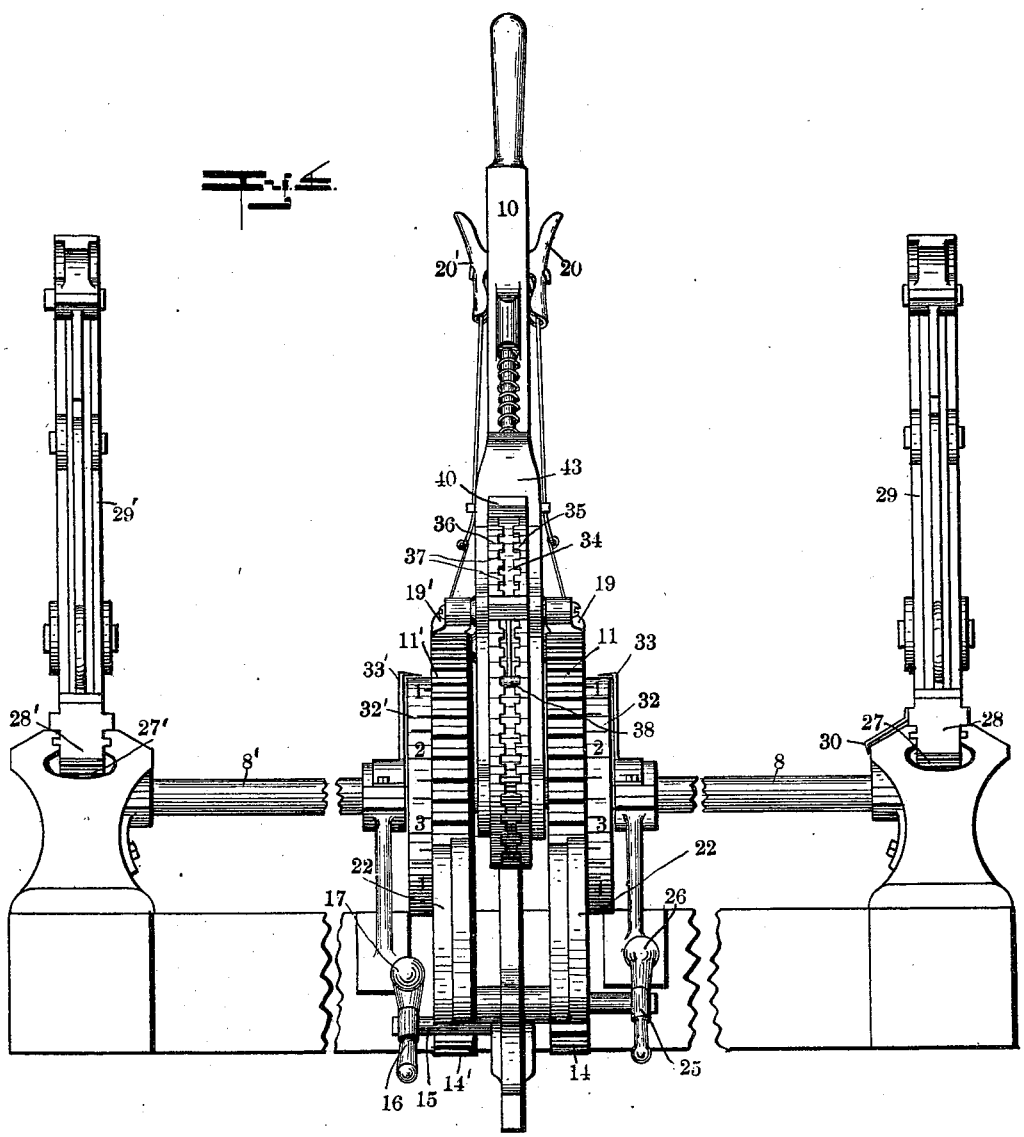

No. 652,727. Patented June 26, 1900.
F. W. SHULS.
SET WORKS FOR SAWMILLS.
(Application filed Feb. 28, 1900.)
(No Model.) 5 Sheets—Sheet 5.
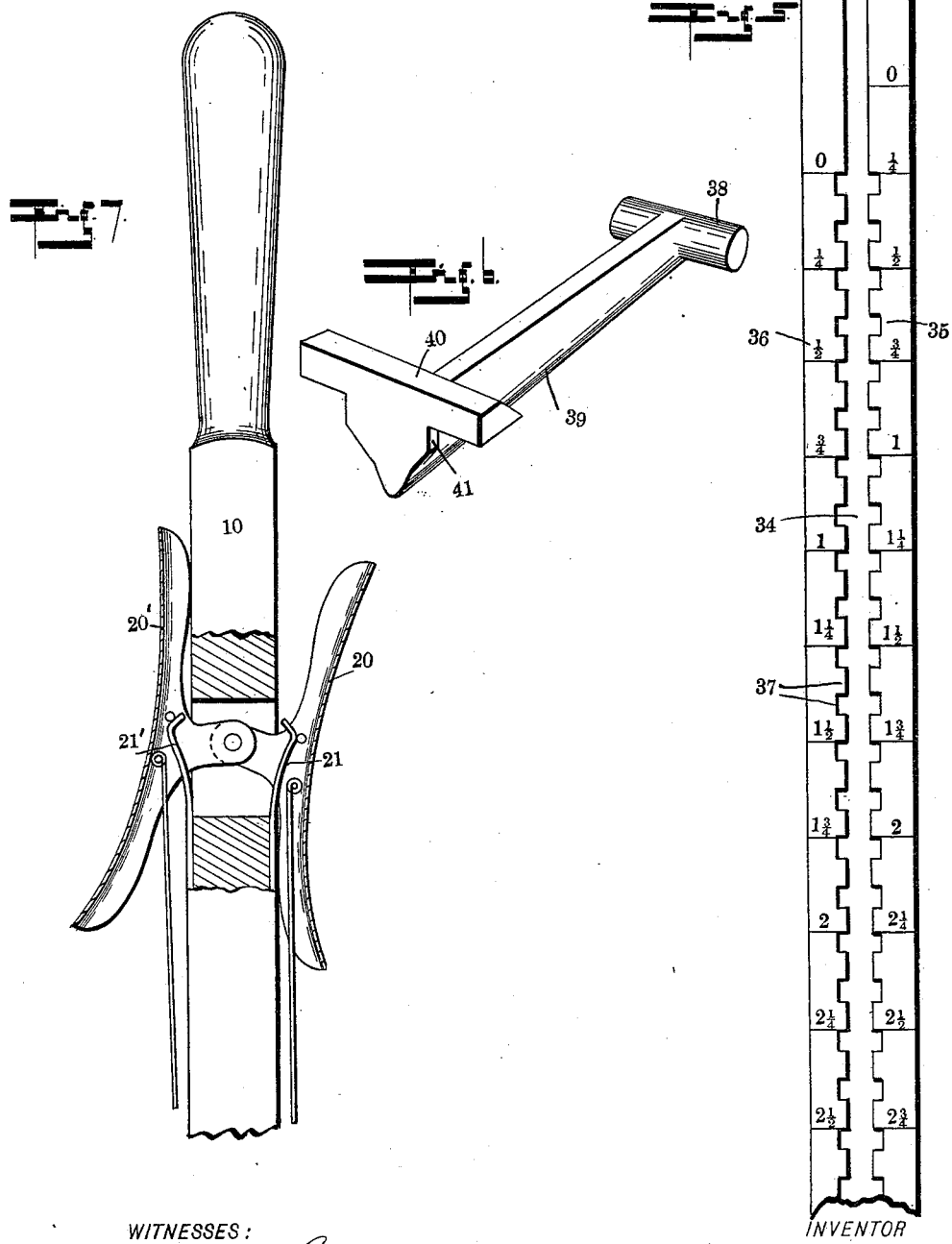
WITNESSES:
Frank A. Fable
Bertha M. Ballard
INVENTOR
Frederic W. Shuls.
BY
Arthur M. Hood
ATTORNEY.

UNITED STATES PATENT OFFICE.

FREDERIC W. SHULS, OF GALION, OHIO, ASSIGNOR TO THE CHANDLER & TAYLOR COMPANY, OF INDIANAPOLIS, INDIANA.

SET-WORKS FOR SAWMILLS.

SPECIFICATION forming part of Letters Patent No. 652,727, dated June 26, 1900.

Application filed February 28, 1900. Serial No. 6,800. (No model.)

*To all whom it may concern:*

Be it known that I, FREDERIC W. SHULS, a citizen of the United States, residing at Galion, in the county of Crawford and State of Ohio, have invented a new and useful Set-Works for Sawmills, of which the following is a specification.

My invention relates to an improved means for operating the adjustable knees of the log-carriage of a sawmill.

The objects of my invention are to produce a set-works controlled by a single operating-lever and of such character that the knees may be operated independently or simultaneously, to provide an improved form of scale to indicate the amount of advancement of the knees, and to provide such other improvements as shall be hereinafter pointed out.

The accompanying drawings illustrate my invention.

Figure 1 is a transverse section with the set-shafts inside the main frame of the carriage. Fig. 2 is a similar view having the set-shafts outside the main frame of the carriage. Fig. 3 is a longitudinal section. Fig. 4 is an elevation. Fig. 5 is a detail of the segment-scale. Fig. 6 is a perspective detail of one of the adjustable stops. Fig. 7 is a detail.

In the drawings, 8 and 8' indicate a pair of set-shafts which are in alinement and the adjacent inner ends of which are supported in a suitable bearing 9, formed in the segment 9'. Pivotally mounted upon shafts 8 and 8' is an operating-lever 10, the lower bifurcated end of which straddles the segment 9'. Secured to shaft 8, adjacent lever 10, is a gear 11, and secured to shaft 8', adjacent the opposite side of lever 10, is a similar gear 11'. Pivotally mounted upon the frame adjacent gears 11 and 11' is an arm 12, having journaled thereon a shaft 13, upon the ends of which are mounted pinions 14 and 14', adapted to mesh with gears 11 and 11', respectively. The normal position of arm 12 is such that pinions 14 and 14' are out of engagement with their respective gears 11 and 11'. The outer end of arm 12 is supported by a shaft 15, provided with a suitable operating-handle 16, the upper end of which should preferably be provided with a weight 17. Shaft 15 carries a cam 18, by means of which arm 12 may be thrown about its pivot, so as to force pinions 14 and 14' simultaneously into engagement with their respective gears 11 and 11'. The weighted end of handle 16 being either to one side or the other of the vertical center when the cam is moved will serve to maintain the cam in either position. It will be readily understood that by a slight alteration a single pinion of sufficient width to mesh with both gears 11 and 11' might be substituted for pinions 14 and 14'.

For the purpose of operating shafts 8 and 8' I mount upon one side of lever 10 suitable pawls 19, adapted to engage the teeth of the gear 11, and upon the other side suitable pawls 19', adapted to engage the teeth of gear 11'. Pawls 19 may be withdrawn from or thrown into engagement with gear 11 by means of a two-armed lever 20, pivoted upon the side of the lever 10, and pawls 19' may be similarly operated by means of a lever 20'. The levers 20 and 20' may be held in either position by means of suitable springs 21 and 21', respectively. A reverse movement of gears 11 and 11' is normally prevented by means of pawls 22, each of which is held normally in engagement with its gear by a weighted arm 23. The angle between pawl 22 and arm 23 is such that arm 23 will come into engagement with the periphery of the adjacent gear before pawl 22 can pass the vertical, thus preventing the pawl from being accidentally thrown out of operative position. Pawls 22 may be thrown out of engagement with the gears, so as to allow a reverse movement of shafts 8 and 8', by means of a cam 24, operated by a handle 25, the weighted end 26 of which will prevent any misplacement of the cam from either position. The shaft 8 is provided with a pinion 27, which meshes with the usual rack 28, formed on the knee 29. Shaft 8' is provided with a similar pinion 27', which meshes with rack 28', formed on knee 29'.

In the ordinary construction of sawmills the position of the knee is indicated by a pointer 30, carried by the knee, which pointer coöperates with the scale 31, marked upon the adjacent stationary portion of the carriage. This scale becomes covered with saw-dust and the operator is compelled to get close to it and remove the dust before a reading can be taken. In my device, therefore, I provide the scale 31 with only the larger divisions, and then form on each gear 11 or 11' a head 32 or 32', respectively, each of which is provided on its periphery with a suitable scale which rotates beneath a suitable pointer 33 or 33', respectively. These scales should preferably be divided into spaces corresponding to inches and fractions thereof to indicate a corresponding movement of the adjacent knee.

For convenience in sawing lumber of uniform thickness I form in the periphery of segment 9' a groove 34, which is overlapped upon each side by scales 35 and 36, so as to form a T-shaped slot. The scales 35 and 36 are divided into graduations indicating inches and fractions thereof and at the principal divisions are serrated, as shown at 37. I provide one or more dogs, each of which consists of tail 38, which is adapted to enter and move through the slot 34, beneath the overhanging edges of the scales 35 and 36, a shank 39, and a head 40, said head being provided with an inner portion 41, which fits into any opposite pair of serrations in scales 35 and 36. The normal position of the lever 10 is back against a stop 42, and lever 10 is provided with a spring-catch 43, which is adapted to engage and stop against heads 40 of the dogs. Catch 43 may be withdrawn from operative position by means of a suitable lever 44.

Every saw has a certain thickness, for which allowance must be made in producing lumber of any desired thickness. It is necessary, therefore, to advance the knees 29 and 29' an amount equal to the thickness of the lumber plus the thickness of the saw each time a cut is to be made. There are times, however, when an economical cutting of a log requires the production of a plank of greater or less thickness. The initial point of scale 35 is at the normal position of catch 43, and said scale is preferably divided into divisions representing inch or fractional-inch advancements of the knees 29 and 29'. Scale 36, however, has its initial point in advance of the normal position of catch 43 a distance proportional to the thickness of the saw and the necessary advance of the knees required to compensate for such thickness. Scale 35 therefore gives readings which correspond to the actual advance of the knees, while scale 36 gives readings which allow for the thickness of the saw, thus making it unnecessary for the sawyer to be continually calculating and allowing for the thickness of the saw.

The operation is as follows: To return the knees to position to receive the log, both sets of pawls 19 and 19' are withdrawn from engagement with their respective gears 11 and 11', cam 24 is thrown up so as to withdraw pawls 22 from engagement with said gears, and cam 18 is thrown down, so as to allow arm 12 to withdraw pinions 14 and 14' from engagement with gears 11 and 11'. With the parts in this position the knees may be independently thrown back by a rotation of the corresponding gears 11 and 11', the said knees being so thrown back until their pointers 30 lie in corresponding divisions on their scales 31. The knees may then be brought into absolute alinement by bringing the scales or heads 32 and 32' into corresponding position beneath the pointers 33 and 33', respectively. The two heads may be held in alinement by throwing pinions 14 and 14' into mesh with gears 11 and 11', thus insuring a uniform advancement of both knees. Either or both sets of pawls 19 and 19' may be then thrown into engagement with their corresponding gears 11 and 11', and by a reciprocation of lever 10 the two knees 29 and 29' may be advanced simultaneously and with absolutely no opportunity for either knee to get in advance of the other. The knees may be returned simultaneously by throwing out pawls 19 and 19' and pawl 22, allowing the pinions 14 and 14' to remain in mesh with gears 11 and 11'. If for any reason the sawyer desires to advance one knee while the other remains stationary, he may, by throwing handle 16 with his foot, allow pinions 14 and 14' to drop out of mesh with gears 11 and 11', and then by withdrawing the advancing pawl from engagement with one of said gears the other gear and its knee operated thereby may be advanced any desired amount. If desired, then the pinions 14 and 14' may be returned to mesh with gears 11 and 11' and the two knees advanced together, the desired disalinement being maintained. If the sawyer desires to produce planks of, say, one inch in thickness, he will place one of dogs 40 at the one-inch mark on scale 36, this being at the point "1¼" on scale 35, if we suppose the saw to make a kerf of one-fourth of an inch. The sawyer will then throw lever 10 backward until catch 43 engages dog 40, and then return lever 10 to its normal position, thus advancing the knees each time an amount equal to the thickness of the board and saw. If for any reason a plank of different thickness is required at any point in the log, the sawyer brings lever 10 against dog 40 and allows it to return to its initial position and then throws lever 10 to that reading upon scale 35 which will, added to the reading of scale 36, give the desired thickness. By this means the cut of the saw is only allowed for once, and this is done without the requirement of any mental calculation on the part of the sawyer. It will be readily understood that pinions 14 and 14' may be thrown into or out of engagement with gears 11 and 11' at any point, so that the operator has the set-works in perfect control and may place the knees in any desired relation to each other and to the carriage.

I claim as my invention—

1. In a set-works for sawmills, the combination with a pair of set-shafts each operating a knee, of a gear mounted upon each of said shafts, a pinion, means for throwing said pinion into and out of engagement with said gears, and means for independently advancing either of said gears.

2. In a set-works for sawmills, the combination with a pair of set-shafts each operating a knee, of a gear secured to each of said shafts, an operating-lever, two pawls one adapted to engage each of said gears, means carried by said lever for throwing either of said pawls into or out of engagement with its corresponding gear, a pinion, and means for throwing said pinion into and out of engagement with said gears.

3. In a set-works for sawmills, the combination with the operating-lever, of a scale-segment, a T-shaped slot formed in the periphery of said segment, a series of serrations formed in the overhanging edges of said slot, and a dog having a tail adapted to traverse said slot, a shank arranged to project from between the overhanging edges of said slot, and a head having a portion adapted to enter any pair of serrations.

4. In a set-works for sawmills, the combination with a pair of set-shafts each operating one of the knees, of a gear carried by each of said shafts, means for independently operating either of said gears, a pair of pinions secured together, means for throwing said pinions into and out of mesh with said gears, and a suitable scale carried by and rotating with each of said set-shafts.

5. In a set-works for sawmills, the combination with a pair of set-shafts each operating one of the knees, of a gear carried by each of said set-shafts, means for independently operating either of said gears, a pair of pinions secured together, and means for throwing said pinions into and out of mesh with said gears.

FREDERIC W. SHULS.

Witnesses:
WILLIAM M. TAYLOR,
FRANK A. FAHLE.